United States Patent
Sukegawa et al.

(10) Patent No.: US 6,759,470 B2
(45) Date of Patent: Jul. 6, 2004

(54) RESIN POWDER FOR MOLDING AND PREPARATION PROCESS OF SAME

(75) Inventors: Masamichi Sukegawa, Settsu (JP); Michio Asano, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 7 days.

(21) Appl. No.: 10/125,543

(22) Filed: Apr. 19, 2002

(65) Prior Publication Data

US 2002/0183451 A1 Dec. 5, 2002

Related U.S. Application Data

(63) Continuation-in-part of application No. PCT/JP00/07221, filed on Oct. 18, 2000.

(30) Foreign Application Priority Data

Oct. 21, 1999 (JP) ............................................. 11-299549

(51) Int. Cl.⁷ ............................................. C08L 27/18
(52) U.S. Cl. ........................ 524/495; 524/508; 525/151; 525/190; 525/934
(58) Field of Search ................................ 524/495, 508; 525/151, 190, 934

(56) References Cited

U.S. PATENT DOCUMENTS 5,709,944 A   1/1998   Kokumai 6,451,903 B1 * 9/2002 Asano .......................... 524/546

FOREIGN PATENT DOCUMENTS

| JP | 1-259055 | 10/1989 |
|----|----------|---------|
| JP | 5-287151 | 11/1993 |
| JP | 7-228744 A | 8/1995 |
| JP | 9-157472 | 6/1997 |
| JP | 10-251413 | 9/1998 |

OTHER PUBLICATIONS

International Preliminary Examination Report for PCT/JP00/07221 dated Oct. 23, 2001.

* cited by examiner

Primary Examiner—Patricia A. Short
(74) Attorney, Agent, or Firm—Sughrue Mion, PLLC

(57) ABSTRACT

There is provided a resin powder for molding which comprises 35 to 98% by weight of a polytetrafluoroethylene powder having an average particle size of not more than 120 μm, 35 to 2% by weight of a heat resistant aromatic polyoxybenzoyl ester resin powder subjected to water repelling treatment and 30 to 0% by weight of an inorganic filler, has an apparent density of not less than 0.6 g/cm³ and an average particle size of not more than 800 μm, and provides a molded article having an elongation at break of not less than 20%. The resin powder for molding is free from separation of a filler, has excellent flowability and apparent density which are important characteristics in handling the powder, and can provide a PTFE molded article having a high elongation which has not been obtained.

18 Claims, 1 Drawing Sheet

RESIN POWDER FOR MOLDING AND PREPARATION PROCESS OF SAME

CROSS-REFERENCE TO RELATED APPLICATION

This is a continuation-in-part of PCT international application No. PCT/JP00/07221 filed on Oct. 18, 2000 pending.

BACKGROUND OF THE INVENTION

The present invention relates to a polytetrafluoroethylene (PTFE) resin powder for molding which contains a heat resistant aromatic polyoxybenzoyl ester resin powder, undergoes less separation of the heat resistant resin powder and has a high apparent density and a high powder flowability. A molded article produced from such a resin powder has a high elongation which has not been obtained so far and is suitable for not only a sealing material such as a packing and gasket but also a sliding material such as a lubrication-free bearing, diaphragm, bellows, tube, hose, casing, lining material, back-up ring, bearing, etc.

The heat resistant aromatic polyoxybenzoyl ester resin powder is known as an organic filler for a PTFE molding powder and is excellent in that the attack by it upon an opposite material is less than that by an inorganic filler. However there is a problem that a phenomenon of separation of a filler arises, that is, the filler is separated from a granulate when the filler is granulated with the PTFE molding powder in water and thereby a final molded article is inferior in a dispersibility of the filler. As a result, an elongation of the obtained molded article is small and therefore in case of the use as an O-ring, etc., fitting work thereof becomes difficult.

An object of the present invention is to provide a resin powder for molding which undergoes less separation of the filler irrespective of the heat resistant aromatic polyoxybenzoyl ester resin powder being contained therein as the filler, has a high apparent density and a high powder flowability and gives a molded article having a high elongation, and also to provide a preparation process of the resin powder.

SUMMARY OF THE INVENTION

Namely, the present invention relates to a resin powder for molding which comprises (A) 35 to 98% by weight of a PTFE powder having an average particle size of not more than 120 μm, (B) 35 to 2% by weight of a heat resistant aromatic polyoxybenzoyl ester resin powder subjected to water repelling treatment and (C) 30 to 0% by weight of an inorganic filler as an optional component, has an apparent density of not less than 0.6 g/cm$^3$ and an average particle size of not more than 800 μm, and provides a molded article having an elongation at break of not less than 20%.

When the resin powder for molding comprises two components of the PTFE powder (A) and the specific water-repelling-treated heat resistant resin powder (B), it is preferable that an amount of the PTFE powder (A) is from 65 to 98% by weight and an amount of the specific water-repelling-treated heat resistant resin powder (B) is from 35 to 2% by weight. Further when the inorganic filler (C) is added thereto, it is preferable that an amount of the powder (A) is from 35 to 97% by weight, an amount of the specific water-repelling-treated heat resistant resin powder (B) is from 35 to 2% by weight and an amount of the inorganic filler (C) is from 30 to 1% by weight.

DETAILED DESCRIPTION

Figure 1:
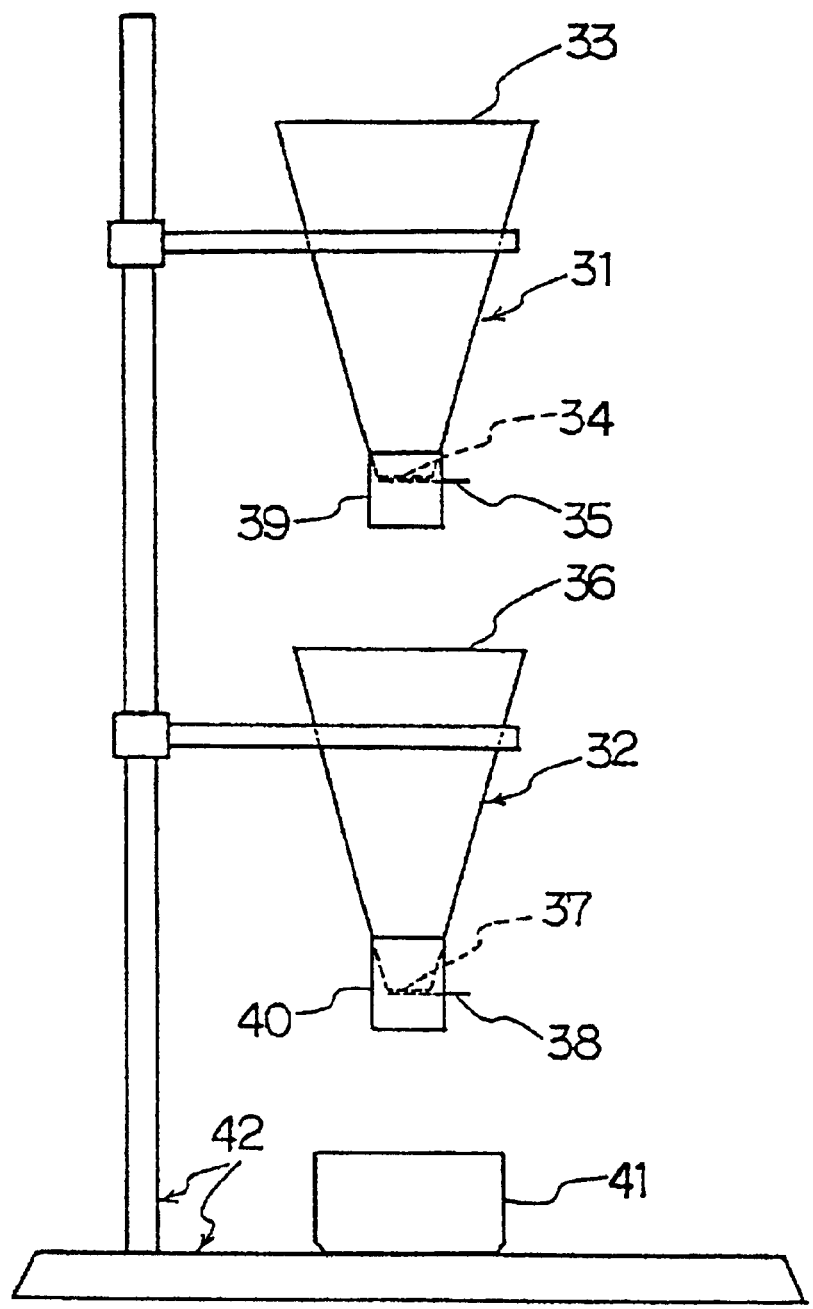
FIG. 1 is a diagrammatic cross-sectional view of an equipment used for measuring a flowability in the present invention.

One of the features of the present invention is that the heat resistant aromatic polyoxybenzoyl ester resin powder is subjected to water repelling treatment. It is preferable that the water repelling treatment is applied on the heat resistant aromatic polyoxybenzoyl ester resin powder before the mixing thereof with the PTFE powder and inorganic filler. The water repelling treatment may be carried out at the time of the mixing with the PTFE powder and inorganic filler.

First, the method of carrying out the water repelling treatment directly on the heat resistant aromatic polyoxybenzoyl ester resin powder is explained below. Examples of the water repelling treatment method are as follows:

(1) a method of water repelling by co-coagulation of the heat resistant aromatic polyoxybenzoyl ester resin powder and the dispersion of PTFE particles (hereinafter referred to as "PTFE dispersion") (co-coagulation method), (2) a method of water repelling by dry-mixing the heat resistant aromatic polyoxybenzoyl ester resin powder and a fine powder of PTFE obtained by emulsion polymerization (hereinafter referred to as "PTFE fine powder") while applying shearing force to the mixture (simple dry mixing method), and (3) a method of water repelling by dry-mixing the heat resistant aromatic polyoxybenzoyl ester resin powder and the PTFE fine powder while finely pulverizing the both powders and applying shearing force to them (mechanochemical treatment method).

The PTFE dispersion and the PTFE fine powder which are used in the above-mentioned methods are handled by a person skilled in the art as those completely different from the above-mentioned PTFE powder (A) in their structures, properties, preparation processes and applications.

Namely, the PTFE is highly viscous since it has a melt viscosity of as high as $10^{11}$ poise even at a temperature of 380° C. which is higher than its melting point (327° C.), and the melt viscosity is very high as compared with $10^3$ to $10^4$ poise which is a melt viscosity of usual heat-meltable plastic at its molding temperature. Therefore the PTFE is considered to be a resin which is not melt-processable, and there is used a molding method of subjecting the PTFE powder to compression molding previously and then sintering at a temperature of not less than its melting point. Thus an apparent density, particle size, hardness, specific surface area and flowability of a starting powder, in addition to its molecular weight, have an effect on the physical properties of the molded article. In consideration of those points and depending on applications, molding methods and required characteristics, there are provided PTFE powders such as (1) a molding powder for compression molding, (2) a molding powder for ram extrusion molding, (3) a fine powder for paste extrusion molding and (4) a dispersion for coating. The PTFE powder (A) used in the present invention is a molding powder classified into the above-mentioned (1) or (2). The PTFE dispersion used in the water repelling treatment of the inorganic filler is the above-mentioned dispersion (4) and the PTFE fine powder is the above-mentioned fine powder (3).

The heat resistant aromatic polyoxybenzoyl ester resin powder may be a non-treated powder or may be previously subjected to surface treatment with a silane coupling agent. When the heat resistant aromatic polyoxybenzoyl ester resin powder previously subjected to surface treatment with a silane coupling agent is used, an elongation of the obtained molded article is further enhanced.

Also there is a method of surface-treating the heat resistant aromatic polyoxybenzoyl ester resin powder simply with a silane coupling agent (silane coupling agent treating method) as the water repelling treatment method, though the effect of enhancing the elongation of the obtained molded article is somewhat inferior.

In the present invention, for example, a powder of a resin having a structural unit (I):

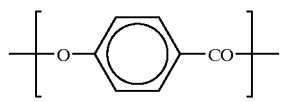
(I)

is preferred as the heat resistant aromatic polyoxybenzoyl ester resin powder to be added as an organic filler from the viewpoint of excellent heat resistance, chemical resistance and abrasion resistance. In addition to the structural unit (I), the resin powder may have the structural unit (II) and/or (III):

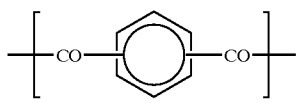
(II)

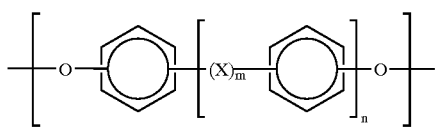
(III)

wherein X is —O—, m is 0 or 1, n is 0 or 1. Examples of commercially available resin powders are, for instance, SUMICA SUPER (available from SUMITOMO CHEMICAL COMPANY, LIMITED), EKONOL (available from CARBORANDOM CO., LTD.), etc. It is preferable that the average particle size is from 1 to 300 μm, more preferably from 5 to 150 μm, particularly preferably from 10 to 50 μm from the viewpoint of good dispersibility of the resin powder and excellent strength of the obtained molded article.

Examples of the silane coupling agent used for the surface (pre)treatment of the heat resistant aromatic polyoxybenzoyl ester resin powder are, for instance, amino silane coupling agents such as γ-aminopropyltriethoxysilane, γ-aminopropyltrimethoxysilane, m- or p-aminophenyltriethoxysilane, γ-ureidopropyltriethoxysilane, N-(β-aminoethyl)-γ-aminopropyltrimethoxysilane and N-(β-aminoethyl)-γ-aminopropylmethyldimethoxysilane. Besides those compounds, for example, there are organic silane compounds such as phenyltrimethoxysilane, phenyltriethoxysilane, p-chlorophenyltrimethoxysilane, p-bromomethylphenyltrimethoxysilane, diphenyldimethoxysilane, diphenyldiethoxysilane and diphenylsilanediol. Among them, from the viewpoint of excellent hydrolyzability and low cost, amino silane coupling agents, particularly γ-aminopropyltriethoxysilane and γ-aminopropyltrimethoxysilane are preferred.

Each of the water repelling methods is explained below more concretely.

(Co-coagulation Method)

First, the heat resistant aromatic polyoxybenzoyl ester resin powder is poured into water. At that time, a small amount of nonionic or anionic surfactant may be added. After the pouring, stirring is carried out for about 3 to about 10 minutes to disperse the heat resistant aromatic polyoxybenzoyl ester resin powder in water. Then the PTFE dispersion is added thereto. After continuing the stirring for 3 to 10 minutes, the mixture is allowed to stand for co-coagulation. A coagulant may be added to the mixture at the same time as the pouring of the PTFE dispersion or after a lapse of a given period of time after the pouring.

A weight ratio in a solid content of the heat resistant aromatic polyoxybenzoyl ester resin powder to the PTFE dispersion may be within the range of from 1/9 to 9/1, preferably from 1/9 to 7/3. When an amount of the PTFE dispersion is too small, a water repelling effect is lowered.

The PTFE dispersion is an aqueous dispersion of PTFE fine particles obtained by emulsion polymerization of tetrafluoroethylene and having an average particle size of from 100 to 400 nm. A proper concentration of the dispersion is from about 5 to about 60% by weight.

The PTFE of the PTFE dispersion may be a tetrafluoroethylene homopolymer or PTFE modified with other monomer, and preferred is the modified PTFE from the viewpoint of excellent heat resistance, chemical resistance and creep resistance.

Examples of the modified PTFE are, for instance, those which are not melt-moldable and contain from 0.001 to 1% by weight of a perfluoro vinyl ether unit represented by the formula (1):

$$-CF_2-CF(-O-X)- \quad (1)$$

wherein X is a perfluoroalkyl group having 1 to 6 carbon atoms or a perfluoroalkoxyalkyl group having 4 to 9 carbon atoms.

Examples of the perfluoro vinyl ether are, for instance, perfluoro(alkyl vinyl ethers) such as perfluoro(methyl vinyl ether) (PMVE), perfluoro(ethyl vinyl ether) (PEVE), perfluoro(propyl vinyl ether) (PPVE) and perfluoro(butyl vinyl ether) (PBVE).

Examples of the above-mentioned surfactants are, for instance, nonionic surfactants such as polyoxyethyl amine oxides, polyoxyethylene alkyl ethers, polyoxyethylene alkyl phenyl ethers, segmented polyalkylene glycols and polyoxyethylene fatty acid esters; anionic surfactants such as higher fatty acids and salts thereof, alkyl sulfates, alkyl sulfonates, alkyl aryl sulfonates and alkyl phosphates; and the like. Examples of the coagulant are, for instance, nitric acid, aluminum nitrate, sulfuric acid, aluminum sulfate, and the like. (Simple dry mixing method)

The heat resistant aromatic polyoxybenzoyl ester resin powder and the PTFE fine powder are poured into a dry mixer and the stirring and mixing are carried out to apply shearing force to the PTFE fine powder for fibrillation thereof and make the fibrillated PTFE fine powder caught on the surface of heat resistant aromatic polyoxybenzoyl ester resin particles for water repelling of the surface thereof.

Examples of the dry mixer are, for instance, Henschel mixer, SUPER mixer, Loedige mixer, Eirich mixer, rocking mixer, and the like.

A weight ratio of the heat resistant aromatic polyoxybenzoyl ester resin powder to the PTFE fine powder may be within the range of from 1/9 to 9/1, preferably from 1/9 to 7/3. When an amount of the PTFE fine powder is too small, a water repelling effect is lowered.

The PTFE fine powder which can be used is obtained by separating the PTFE polymer particles from the above-mentioned PTFE dispersion prepared by emulsion polymerization of tetrafluoroethylene and forming them into a powder of secondary particles having an average particle size of from 200 to 800 μm.

The PTFE of the PTFE fine powder may be a tetrafluoroethylene homopolymer or PTFE (for example, the modified PTFE of the above-mentioned formula (1)) modified with other monomer like the case of the PTFE dispersion. (Mechanochemical treatment method)

The heat resistant aromatic polyoxybenzoyl ester resin powder and the PTFE fine powder are poured into a mechanochemical type ultra fine pulverizer and while finely pulverizing, shearing force is applied to the surfaces of both particles to activate the surfaces of both particles and to subject the PTFE fine particles to bonding by fusing on the surfaces of heat resistant aromatic polyoxybenzoyl ester resin particles (so-called "mechano-fusion").

Examples of the mechanochemical type ultra fine pulverizer are, for instance, MECHANOFUSION SYSTEM (available from HOSOKAWA MICRON CORPORATION), HYBRIDIZATION SYSTEM (available from NARA MACHINERY CO., LTD.), and the like.

The weight ratio of the heat resistant aromatic polyoxybenzoyl ester resin powder to the PTFE fine powder may be within the range of from 1/9 to 9/1, preferably from 1/9 to 7/3. When the amount of the PTFE fine powder is too small, a water repelling effect is lowered.

The PTFE powder to be used on the simple dry mixing method can be used for the mechanochemical treatment method.

The water repelling treatment to be applied directly to the heat resistant aromatic polyoxybenzoyl ester resin powder is as explained above. In addition, the water repelling treatment can be carried out when mixing the heat resistant aromatic polyoxybenzoyl ester resin powder with other component (batch dry mixing method). This batch method is the same as the simple dry mixing method except that the PTFE powder (A) having an average particle size of not more than 120 μm and as the case demands, the inorganic filler (C) are poured into the dry mixing equipment simultaneously together with the heat resistant aromatic polyoxybenzoyl ester resin powder, and the fibrillation of the PTFE fine powder particles is also adopted on the water repelling mechanism.

The resin powder for molding of the present invention is obtained by mixing the heat resistant aromatic polyoxybenzoyl ester resin powder (B) subjected to such water-repelling, the PTFE powder (A) having an average particle size of not more than 120 μm and as the case demands, the inorganic filler (C).

The PTFE powder (A) having an average particle size of not more than 120 μm may be a tetrafluoroethylene homopolymer or a modified PTFE, and the modified PTFE represented by the formula (1) can be used preferably. The preferable average particle size of the PTFE powder is from 10 to 50 μm.

Further the molded article which is produced by molding the modified PTFE powder solely and has a life of bending 7,000,000 times or more is preferred as a sealing material which is used for equipment undergoing reciprocating motions and is required to have durability.

A molded article having an elongation at break of not less than 50%, further not less than 100% can be produced from the resin powder for molding of the present invention.

Examples of the inorganic filler (C) which is an optional component are, for instance, natural graphite, artificial graphite, carbon black, coke powder, spherical carbon, molybdenum disulfide powder, carbon fiber, graphite whisker, tungsten disulfide, boron nitride, talc, mica, mica fluoride, graphite fluoride, carbon fluoride, expanded graphite, and the like. Particularly preferred is a natural graphite. With respect to the size of the inorganic filler, it is preferable that in case of a powder, an average particle size thereof is from 0.1 to 500 μm, preferably from 5 to 20 μm, and in case of a fiber, an average fiber diameter thereof is from 0.1 to 100 μm, preferably from 0.1 to 50 μm and an average fiber length thereof is from 20 to 1,000 μm.

When the inorganic filler is not blended, the PTFE powder (A) having an average particle size of not more than 120 μm and the water-repelling-treated heat resistant aromatic polyoxybenzoyl ester resin powder (B) are mixed in a ratio (A)/(B) (% by weight) of 65 to 98/35 to 2, preferably 70 to 98/30 to 2, particularly 75 to 96/25 to 4. When the amount of the component (B) is decreased, an abrasion resistance is lowered, and when the amount is too large, cost becomes very high.

When the inorganic filler (C) is blended, the ratio (A)/(B)/(C) (% by weight) is 35 to 97/35 to 2/30 to 1, preferably 50 to 96/30 to 3/20 to 1, particularly 60 to 95/25 to 4/15 to 1. When the amount of the inorganic filler is too large, an abrasion resistance is lowered.

To the resin powder for molding of the present invention may be blended an organic filler within the range not lowering the properties of the powder. Examples of the suitable organic filler are, for instance, fluorine-containing resins such as tetrafluoroethylene/perfluoro(alkyl vinyl ether) copolymer (PFA) and tetrafluoroethylene/hexafluoropropylene copolymer (FEP). The content of the organic filler is, for example, from 0.5 to 50% by weight based on the weight of the resin powder for molding.

In the present invention, the resin powder may be a powder mixture which is prepared by simply mixing the above-mentioned components and gives the above-mentioned apparent density, average particle size and elongation of the molded article, and it is desirable that the granulation treatment explained below is carried out to enhance handling property such as powder flowability and productivity of the equipment for producing a molded article.

The granulation methods which are preferably adopted in the present invention are a method of granulation in water, a method of granulation in the state of emulsion and granulation methods explained hereinbelow. From the point that finely pulverized particles having a certain range of apparent density can be obtained, the method of granulation in water and the method of granulation in the state of emulsion are suitable, and particularly from the viewpoint of enhancing electrostatically charging property, powder flowability and apparent density and pulverizing finely, the method of granulation in the state of emulsion is suitable.

Then each granulation method is briefly explained below.

(I) Granulation method in water

Prior to the granulation, firstly, the components (A), (B) and as the case demands, (C) are mixed in the dry mixer to obtain a powder mixture in which each component is dispersed uniformly. However this mixing step may be omitted when the above-mentioned batch dry mixing method is employed.

The powder mixture is poured into water and granulated by stirring in water in the presence of an organic liquid forming a liquid—liquid interface with water. In this granulation method in water, the water-repelling PTFE particles and the heat resistant aromatic polyoxybenzoyl ester resin particles subjected to water repelling treatment gather around the dispersed particles of the organic liquid and are agglomerated and thereby formed into a granulated powder.

The organic liquid forming a liquid—liquid interface with water may be an organic liquid capable of forming a liquid—liquid interface with water and being present as droplets in water. The organic liquid may dissolve somewhat in water as far as it is capable of forming a liquid—liquid interface with water and being present as droplets in water. Examples of the organic liquid are, for instance, alcohols such as 1-butanol and 1-pentanol; ethers such as diethyl ether and dipropyl ether; ketones such as methyl ethyl ketone and 2-pentanone; aliphatic hydrocarbons such as pentane and dodecane; aromatic hydrocarbons such as benzene, toluene and xylene; halogenated hydrocarbons such as methylene chloride, tetrachloroethylene, trichloroethylene, chloroform, chlorobenzene, trichlorotrifluoroethane, monochlorotrifluoroethane, difluorotetrachloroethane, 1,1,1-trichloroethane, 1,1-dichloro-2,2,3,3,3-pentafluoropropane, 1,3-dichloro-1,1,2,2,3-pentafluoropropane, 1,1-dichloro-2,2,2-trifluoroethane and 1,1-dichloro-1-fluoroethane; and the like. Among them, the halogenated hydrocarbons are preferred, and particularly preferred are chlorinated- and fluorochlorinated-hydrocarbons such as 1,1,1-trichloroethane, 1,1-dichloro-2,2,3,3,3-pentafluoropropane, 1,3-dichloro-1,1,2,2,3-pentafluoropropane, 1,1-dichloro-2,2,2-trifluoroethane and 1,1-dichloro-1-fluoroethane. Those are nonflammable and satisfy requirements for flon restrictions. Those organic liquids may be used solely or in combination use of two or more thereof.

An adding amount of the organic liquid forming a liquid—liquid interface with water is from 30 to 80 parts by weight, preferably from 40 to 60 parts by weight on the basis of the total amount 100 parts by weight of (A), (B) and as the case demands, (C).

The stirring speed, etc. may be optionally set depending on an intended particle size, etc.

(II) Granulation method in the state of emulsion

This method is the same as the granulation method in water except that the granulation is carried out in the presence of a surfactant together with the organic liquid forming a liquid—liquid interface with water.

Examples of the surfactant are, for instance, polyoxyethylamine oxides, alkylamine oxides, polyoxyethylene alkyl ethers, polyoxyethylene alkyl phenyl ethers, polyoxyethylene fatty acid esters, sorbitan fatty acid esters, polyoxyethylene sorbitan fatty acid esters, glycerine esters, polyoxyethylene alkylamines, segmented polyalkylene glycols having a hydrophobic segment comprising poly (oxyalkylene) unit in which the alkylene has 3 or 4 carbon atoms and a hydrophilic segment comprising poly (oxyethylene) unit, the derivatives thereof, and the like (cf. JP-A-10-316763).

As the anionic surfactant, there can be used known ones, for example, higher fatty acid and its salt, alkyl sulfate, alkyl sulfonate, alkyl aryl sulfonate, alkyl phosphate, and the like. Particularly preferable anionic surfactants are a sulfate of higher alkyl alcohol, for example, sodium lauryl sulfate or a fluorine-containing sulfonic acid type or carboxylic acid type anionic surfactant having a fluoroalkyl group or chlorofluoroalkyl group. Representative compounds thereof are those represented by the formula:

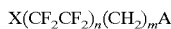

$X(CF_2CF_2)_n(CH_2)_mA$ or the formula:

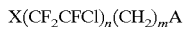

$X(CF_2CFCl)_n(CH_2)_mA$ wherein X is hydrogen atom, fluorine atom or chlorine atom, n is an integer of from 3 to 10, m is an integer of from 1 to 4, A is carboxyl group, sulfonic acid group, an alkali metal or ammonium residue thereof.

An adding amount of the surfactant is from 0.01 to 10% by weight, preferably from 0.05 to 1% by weight based on the total amount of the components (A) and (B).

In addition to the above-mentioned methods, the following granulation methods can be employed.

(III) The granulation is carried out by pouring the PTFE powder (A), the water-repelling-treated heat resistant aromatic polyoxybenzoyl ester resin powder (B) and as the case demands, the inorganic filler (C) into water separately without pre-mixing thereof, stirring in the presence of a surfactant to obtain the mixture in a state of slurry and then adding the above-mentioned organic liquid forming a liquid—liquid interface with water and stirring.

(IV) The granulation is carried out by pouring the PTFE powder (A) obtained by wet-pulverizing, without drying, a polymerization reaction solution containing PTFE particles having an average particle size of not more than 120 μm after the polymerization reaction, stirring in the presence of a surfactant to make the mixture in a state of slurry, pouring the water-repelling-treated heat resistant aromatic polyoxybenzoyl ester resin powder (B) and as the case demands, the inorganic filler (C), further adding an organic liquid forming a liquid—liquid interface with water and then stirring.

(V) The granulation is carried out by such a treatment that a powder mixture of the PTFE powder (A), the water-repelling-treated heat resistant aromatic polyoxybenzoyl ester resin powder (B) and as the case demands, the inorganic filler (C) is added to a liquid capable of getting those components wet (for example, an organic liquid, an aqueous solution having a high concentration of a surfactant, etc.) in the absence of water, and then applying mechanical force (stirring, etc.) to the mixture in a wet state.

In the present invention, when the water-repelling-treated heat resistant aromatic polyoxybenzoyl ester resin powder (B) is used, separation of the filler does not arise in the above-mentioned granulation methods, and a resin powder having a high apparent density can be obtained irrespective of a relatively small particle size.

Namely, the resin powders for molding of the present invention are a resin powder having an average particle size of not more than 800 μm and an apparent density of not less than 0.6 g/cm³, more preferably a resin powder having an apparent density of not less than 0.60 g/cm³ and less than 0.7 g/cm³, an angle of repose of not more than 42 degrees, an average particle size of not more than 500 μm, a flowability of not less than 5 times and an electrostatic charge of not more than 50 V;

a resin powder having an apparent density of not less than 0.70 g/cm³ and less than 0.75 g/cm³, an angle of repose of not more than 40 degrees, an average particle size of not more than 500 μm, a flowability of not less than 5 times and an electrostatic charge of not more than 50 V; and a resin powder having an apparent density of not less than 0.75 g/cm³ and not more than 0.85 g/cm³, an angle of repose of not more than 38 degrees, an average particle size of not more than 500 μm, a flowability of not less than 5 times and an electrostatic charge of not more than 50 V.

The resin powder for molding of the present invention can be used as a molding material for various molding methods. Examples of the molding methods are, for instance, known molding methods such as paste extrusion molding, ram extrusion molding, compression molding, hot coining molding and isostatic molding. Among them, particularly the compression molding method is most suitable.

In any molding methods, a molded article is finally subjected to sintering. In the present invention, the sintering temperature is from 323° to 400° C., preferably from 350° to 380° C.

Thus the molded article is produced from the resin powder for molding of the present invention. One of the features of the present invention is that the molded article exhibits a high elongation at break which has not been obtained so far. When the PTFE powder is used solely, the elongation at break of the obtained molded article is at most up to 17%, and there have been obtained no PTFE molded articles having an elongation at break exceeding 20%, not to speak of PTFE molded articles having an elongation at break of not less than 50%, further not less than 100% which have not been thought of from a commonsense point of view.

The molded article obtained from the resin powder of the present invention has a smooth surface as compared with a molded article which is produced by the same molding method and is obtained from a resin powder prepared by using a heat resistant aromatic polyoxybenzoyl ester resin powder not subjected to water repelling treatment. For example, the molded article having a surface roughness of not more than 3.0 μm can be obtained according to the present invention.

Examples of the molded article produced from the resin powder for molding of the present invention are, for instance, not only sealing materials such as packing and gasket but also a sliding material such as a non-lubricating bearing, diaphragm, bellows, tube, hose, casing, lining material, backup ring, bearing, etc. Examples of the packing are self-seal packings such as lip packing and squeeze packing, oil seal, piston ring, rod ring, mechanical seal, etc. Also the molded article can be applied on the gaskets such as O-ring and gaskets produced from a composite material comprising the molded article and cloth, metal, rubber, or the like. Among them, the resin powder for molding of the present invention is suitable as a molding material for a seal ring, piston ring, oil seal and bearing which are required to have an elongation when fitting for use.

The present invention is then explained by means of preparation examples of the water-repelling-treated heat resistant aromatic polyoxybenzoyl ester resin powder (B) and examples, but the present invention is not limited to them.

PREPARATION EXAMPLES 1 to 3

(Method of Treatment with Silane Coupling Agent)

A 10 liter disc rotation type granulator (HIGH SPEED MIXER FS-10 available from FUKAE KOGYO KABUSHIKI KAISHA) was charged with 2 kg of SUMICA SUPER E101S (non-treated heat resistant aromatic polyoxybenzoyl ester resin powder available from SUMITOMO CHEMICAL COMPANY, LIMITED, average particle size: 20 μm). Further thereto were added 100 ml of aqueous solution of ethanol (ethanol/water=9/1) and an amino silane coupling agent. After stirring for five minutes at a rotation speed of 800 rpm of a main shaft and 3,600 rpm of a chopper, the mixture was removed and thus a product treated with the silane coupling agent was obtained.

The used amino silane coupling agent was γ-aminopropyltriethoxysilane (A-1100 available from NIPPON UNICAR CO., LTD.), and was added in such an amount that the adhesion amount shown in Table 1 was obtained. The adhesion amount was measured by fluorescent X-ray analysis.

PREPARATION EXAMPLES 4 to 7

(Co-coagulation Method)

An agitation tank was charged with 4 liter of water, 1 kg of SUMICA SUPER E101S and further 0.1 g of a nonionic surfactant (Pronon #104 available from NOF CORPORATION), followed by stirring for five minutes to carry out dispersion. To the dispersion was added a PTFE dispersion with stirring in such an amount that the adhesion amount (solid content) shown in Table 2 was obtained, and then a nitric acid was added thereto as a coagulating agent for co-coagulation. A coagulated product was removed and dehydrated and dried at 165° C. for 15 hours to obtain the water-repelling-treated heat resistant aromatic polyoxybenzoyl ester resin powder (B).

In Preparation Examples 6 and 7, the heat resistant aromatic polyoxybenzoyl ester resin powder subjected to treating with a silane coupling agent which was obtained in Preparation Example 1 was used as a starting heat resistant aromatic polyoxybenzoyl ester resin powder.

Also a dispersion of PTFE particles (average particle size: 290 nm, solid content: 30.4% by weight) modified with PMVE was used as the PTFE dispersion. An adhesion amount of the PTFE dispersion was measured by elementary analysis.

PREPARATION EXAMPLES 8 to 11

(Simple Dry Mixing Method) A 10 liter Henschel mixer (available from MITSUI MINING COMPANY, LIMITED) was charged with 1.2 kg of SUMICA SUPER E101S and further a PTFE fine powder was added in such an amount that the adhesion amount shown in Table 3 was obtained, followed by mixing for 10 minutes at 1,800 rpm to obtain the water-repelling-treated heat resistant aromatic polyoxybenzoyl ester resin powder (B).

In Preparation Examples 10 and 11, the heat resistant aromatic polyoxybenzoyl ester resin powder subjected to treating with a silane coupling agent which was obtained in Preparation Example 1 was used as a starting heat resistant aromatic polyoxybenzoyl ester resin powder.

Also an agglomerated PTFE powder (average particle size: 300 μm) modified with PMVE was used as the PTFE fine powder. An adhesion amount of the PTFE fine powder was measured by elementary analysis.

PREPARATION EXAMPLES 12 to 15

(Mechanochemical Treatment Method)

A MECHANOFUSION SYSTEM (AMF-20FS available from HOSOKAWA MICRON CORPORATION) was charged with 130 g of SUMICA SUPER E101S and the same modified PTFE fine powder as used in Preparation Example 8 in such an amount that the adhesion amount shown in Table 4 was obtained, followed by treating for 20 minutes under the condition of mixing by pulverizing and stirring at the number of rotations of a stator of 1,600 rpm. Thus the water-repelling-treated heat resistant aromatic polyoxybenzoyl ester resin powder (B) was obtained.

In Preparation Examples 14 and 15, the heat resistant aromatic polyoxybenzoyl ester resin powder subjected to treating with a silane coupling agent which was obtained in Preparation Example 1 was used as a starting heat resistant aromatic polyoxybenzoyl ester resin powder. An adhesion amount of the PTFE fine powder was measured by elementary analysis.

PREPARATION EXAMPLES 16 to 17

(Batch Dry Mixing Method)

A 10 liter Henschel mixer (available from MITSUI MINING COMPANY, LIMITED) was charged with 0.576 kg of PTFE powder for molding, 0.18 kg of SUMICA SUPER E101S, 0.06 kg of natural graphite (CPB-3000 available from CHUETSU KOKUEN KABUSHIKI KAISHA, average particle size: 9 μm) and 0.384 kg of the same modified PTFE fine powder as used in Preparation Example 8, followed by mixing for 10 minutes under the mixing condition of the number of rotations of 1,800 rpm. Thus the PTFE resin powder for molding which contains the water-repelling-treated heat resistant aromatic polyoxybenzoyl ester resin powder (B) (an adhesion amount of the PTFE fine powder was 40% by weight) was obtained.

As shown in Table 5, in Preparation Example 17, the heat resistant aromatic polyoxybenzoyl ester resin powder subjected to treating with a silane coupling agent which was obtained in Preparation Example 1 was used as a starting heat resistant aromatic polyoxybenzoyl ester resin powder. An adhesion amount of the PTFE fine powder was measured by elementary analysis.

Also the PTFE powder for molding was a PTFE powder (average particle size: 30 μm) modified with 1% by weight of PMVE.

EXAMPLE 1

A Henschel mixer (available from MITSUI MINING COMPANY, LIMITED) was charged with 80 parts by weight of PTFE powder (average particle size: 30 μm) modified with 1% by weight of PMVE, 15 parts by weight of the water-repelling-treated heat resistant aromatic polyoxybenzoyl ester resin powder (B) which was obtained in Preparation Example 1 and 5 parts by weight of natural graphite (CPB-3000 available from CHUETSU KOKUEN KABUSHIKI KAISHA, average particle size: 9 μm), followed by pre-mixing under the mixing condition of the number of rotations of 1,800 rpm to obtain a powder mixture for granulation.

A 10 liter granulation tank containing 6 liter of ion-exchanged water was charged with 2 kg of the powder mixture obtained above. Thereto was added 40 ml of an aqueous solution of 5% by weight of nonionic surfactant (Pronon #102 available from NOF CORPORATION, ethylene oxide block copolymer of propylene glycol (molecular weight of oxypropylene segment: 1,250, molecular weight of oxyethylene segment: 250)), followed by stirring with a cone blade at 800 rpm at 25° C.±2° C. for five minutes. Then after 5-minute deagglomeration at 3,000 rpm by means of a 100 mm diameter dispersing blade, the inside temperature of the tank was increased to 38° C. over 20 minutes with stirring at 800 rpm by the cone blade and the granulation was terminated. A granulated product was separated from water with a metal net having an opening of 90 μm and then dried in an electric oven at 165° C. for 16 hours to obtain the resin powder for molding of the present invention.

After the separation of the granulated product, exhaust water was collected in a transparent vessel and allowed to stand for 30 minutes and an amount of the water-repelling-treated heat resistant aromatic polyoxybenzoyl ester resin powder (B) which was sedimented in the bottom of the transparent vessel was observed with naked eyes. As a result, separation of the filler was very little and a sedimented amount was not more than about 0.1% by weight based on the charged amount.

With respect to the obtained resin powder for molding, the following powder characteristics were evaluated. The results are shown in Table 1.

(Apparent Density)

Measured according to JIS K 6891-5.3.

(Flowability)

Measured in accordance with the method described in JP-A-3-259925. Namely, there is used a measuring device comprising a support base 42, an upper hopper 31 and a lower hopper 32. The both hoppers are aligned on their center lines and supported on the support base 42 as shown in FIG. 1 (corresponding to FIG. 3 described in JP-A-3-259925). The upper hopper 31 has an inlet 33 of 74 mm diameter, an outlet 34 of 12 mm diameter and a partition plate 35. The height from the inlet 33 to the outlet 34 is 123 mm. The partition plate 35 is provided on the outlet 34, and thereby the powder in the hopper can be kept therein and dropped optionally. The lower hopper 32 has an inlet 36 of 76 mm diameter, an outlet 37 of 12 mm diameter and a partition plate 38. The height from the inlet 36 to the outlet 37 is 120 mm, and the partition plate 38 is provided on the outlet 37 like the upper hopper. The upper hopper and the lower hopper are adjusted so that the distance between the both partition plates is 15 cm. In FIG. 1, the numerals 39 and 40 indicate outlet covers of each hopper, and the numeral 41 indicates a vessel for receiving the dropped powder.

Prior to measuring the flowability, about 200 g of powder is allowed to stand for not less than four hours in a room, the temperature of which is adjusted to 23.5° to 24.5° C., and then sieved with a sieve having a sieve opening of 1.7 mm. The measurement of the flowability is carried out at the same temperature.

(I) At first, immediately after the upper hopper 31 is charged with just a cup of powder by using a 30 cc cup, the partition plate 35 is pulled out to drop the powder into the lower hopper. When the powder does not drop, the powder is stuck with a wire. After the powder has dropped completely into the lower hopper 32, the dropped powder is allowed to stand for 15±2 seconds, and then the partition plate 38 of the lower hopper is pulled out to see whether the powder is dropped or not from the outlet 37. When the powder is dropped completely within eight seconds, the powder is estimated to have been dropped as required.

(II) The same steps as above are repeated three times to see if the powder is dropped as required. In case where the powder is dropped satisfactorily twice or more, the flowability of the powder is estimated to be "Good". In case where the powder is never dropped, the flowability of the powder is estimated to be "Not good". In case where in three series of the dropping test, the powder has been dropped only one time, the dropping test is further conducted twice, and when the two series of the dropping test are both satisfactory, the flowability is estimated to be "Good". In other cases, the flowability is estimated to be "Not good".

(III) With respect to the powder estimated to be "Good", the upper hopper is charged with two cups of powder by using the same 30 cc cup, and the dropping test of the powder is conducted in the same manner as above. When as a result, the flowability is estimated to be "Good", the number of cups filled with the powder is increased successively and the dropping test is continued until the flowability is estimated to be "Not good". The dropping test is conducted up to eight cups at most. The powder having flowed out from the lower hopper in the previous dropping test may be re-used.

(IV) The larger the amount of the PTFE powder is, the more difficult to drop.

The number of cups when the flowability is estimated to be "Not good" is subtracted by 1, and the obtained value is taken as "Flowability" of the powder.

(Angle of Repose)

Measured with Powder Tester available from HOSOKAWA MICRON CORPORATION.

(Electrostatic Charge)

Handy Electrostatic Meter SFM775 available from ION SYSTEMS, INC. is used to determine an electrostatic charge.

(Average particle size and particle size distribution A and B)

Standard sieves (JIS Z 8801) of 1.7 mm, 850 μm, 500 μm, 300 μm, 250 μm and 180 μm are placed in that order from the top, and PTFE granular powder is put on the sieve having a 1.7 mm sieve opening. The sieves are vibrated to drop smaller particles downward through each sieve in order. Then after the ratio of the powder remaining on each sieve is obtained by %, accumulated percentages (ordinate) of each remaining powder to the openings of each sieve (abscissa) are plotted on the logarithmic probability paper, and those points are connected with a line. The particle size, the proportion of which is 50% on that line, is obtained and is regarded as an average particle size. A % by weight of the powder remaining on each sieve of 1.7 mm, 850 μm, 500 μm, 300 μm, 250 μm and 180 μm is regarded as the particle size distribution A. Further the particle size distribution B is a proportion in weight of the particles having a diameter 0.7 to 1.3 times the average particle size on the basis of the whole particles, and is calculated by multiplying the average particle size by 0.7 or 1.3. The obtained values are plotted on the accumulated weight percentage curve, and thus the weight percentage is obtained.

The obtained resin powder for molding is molded under the following conditions to produce a molded article for test. The following properties of the molded article for test were evaluated. The results are shown in Table 1.

(Elongation at Break)

210 g of the powder was put in a metal die of a 50 mm diameter and maintained at a molding pressure of 49 MPa for five minutes. The obtained pre-molded article was heated up from room temperature to 365° C. at a heating rate of 50° C./hr, and after maintained at 365° C. for 5.5 hours, was cooled at a cooling rate of 50° C./hr.

The molded article was cut to a 0.5 mm thick tape with a bite and punched into a JIS No.3 dumbbell-shaped test piece. The test piece was stretched at a rate of 200 mm/min by using AUTOGRAPH having a total weight of 500 kg according to JIS K 6891-58 to measure an elongation at break.

(Surface Roughness)

The roughness of top surface of the molded article obtained by molding in the same manner as the molded article for measuring the elongation at break was measured according to the center line average roughness (Ra) method described in JIS B 0601 by using a surface roughness measuring device available from TOKYO SEIMITSU KIKAI KABUSHIKI KAISHA.

EXAMPLES 2 to 3

A granulation was carried out in the same manner as in Example 1 except that the water-repelling-treated heat resistant aromatic polyoxybenzoyl ester resin powder (B) which was prepared in Preparation Example shown in Table 1 was used to obtain the resin powder for molding of the present invention. A state of separation of the filler, characteristics of the powder and properties of the molded article were evaluated. The results are shown in Table 1.

TABLE 1

|  | Ex. 1 | Ex. 2 | Ex. 3 |
| --- | --- | --- | --- |
| Water repelling treatment (treated with a silane coupling agent) | Prep. Ex. 1 | Prep. Ex. 2 | Prep. Ex. 3 |
| Heat resistant aromatic polyoxybenzoyl ester resin powder | Not treated | Not treated | Not treated |
| Adhesion amount of silane coupling agent (% by weight) | 0.1 | 0.5 | 1.0 |
| Components of resin powder (part by weight) | | | |
| Resin powder subjected to water repelling treatment | 15 | 15 | 15 |
| PTFE powder | 80 | 80 | 80 |
| Natural graphite filler | 5 | 5 | 5 |
| Granulation method | Granulation in the state of emulsion | Granulation in the state of emulsion | Granulation in the state of emulsion |
| Separation of filler | None | None | None |
| Characteristics of powder | | | |
| Apparent density (g/cm$^3$) | 0.69 | 0.76 | 0.70 |
| Flowability (times) | 8 | 8 | 8 |
| Angle of repose (degree) | 40.6 | 37.2 | 38.0 |
| Electrostatic charge (V) | 5 | 8 | 8 |
| Average particle size ($\mu$m) | 462 | 429 | 402 |
| Particle size distribution A (% by weight) | | | |
| on 1.7 mm sieve opening | 0.0 | 0.0 | 0.0 |
| on 850 $\mu$m sieve opening | 1.4 | 2.0 | 6.5 |
| on 500 $\mu$m sieve opening | 39.4 | 26.8 | 38.7 |
| on 300 $\mu$m sieve opening | 49.7 | 43.5 | 42.3 |
| on 250 $\mu$m sieve opening | 6.0 | 14.6 | 7.9 |
| on 180 $\mu$m sieve opening | 2.0 | 10.0 | 3.2 |
| passed 180 $\mu$m sieve opening | 0.5 | 2.0 | 0.2 |
| Particle size distribution B (% by weight) | 55.5 | 55.3 | 50.7 |
| Properties of molded article | | | |
| Elongation at break (%) | 72 | 89 | 99 |
| Surface roughness ($\mu$m) | 2.8 | 2.8 | 2.7 |

EXAMPLES 4 to 7

A granulation was carried out in the same manner as in Example 1 except that the water-repelling-treated heat resistant aromatic polyoxybenzoyl ester resin powder (B) which was prepared in Preparation Example shown in Table 2 was used to obtain the resin powder for molding of the present invention. A state of separation of the filler, characteristics of the powder and properties of the molded article were evaluated. The results are shown in Table 2.

TABLE 2

|  | Ex. 4 | Ex. 5 | Ex. 6 | Ex. 7 |
|---|---|---|---|---|
| Water repelling treatment (Co-coagulation method) | Prep. Ex. 4 | Prep. Ex. 5 | Prep. Ex. 6 | Prep. Ex. 7 |
| Heat resistant aromatic polyoxybenzoyl ester resin powder | Not treated | Not treated | Treated with silane coupling agent | Treated with silane coupling agent |
| Adhesion amount of PTFE dispersion (% by weight) | 10 | 40 | 10 | 40 |
| Components of resin powder (part by weight) | | | | |
| Resin powder subjected to water repelling treatment | 15 | 15 | 15 | 15 |
| PTFE powder | 80 | 80 | 80 | 80 |
| Natural graphite filler | 5 | 5 | 5 | 5 |
| Granulation method | Granulation in the state of emulsion | Granulation in the state of emulsion | Granulation in the state of emulsion | Granulation in the state of emulsion |
| Separation of filler | None | None | None | None |
| Characteristics of powder | | | | |
| Apparent density (g/cm$^3$) | 0.72 | 0.73 | 0.71 | 0.73 |
| Flowability (times) | 8 | 7.5 | 8 | 7.5 |
| Angle of repose (degree) | 36.8 | 37.8 | 38.0 | 38.5 |
| Electrostatic charge (V) | 7 | 8 | 8 | 8 |
| Average particle size ($\mu$m) | 478 | 402 | 475 | 428 |
| Particle size distribution A (% by weight) | | | | |
| on 1.7 mm sieve opening | 0.0 | 0.0 | 0.0 | 0.0 |
| on 850 $\mu$m sieve opening | 2.4 | 5.5 | 3.5 | 3.1 |
| on 500 $\mu$m sieve opening | 25.1 | 35.2 | 40.8 | 32.2 |
| on 300 $\mu$m sieve opening | 45.9 | 49.8 | 48.0 | 40.9 |
| on 250 $\mu$m sieve opening | 14.3 | 8.5 | 5.0 | 11.2 |
| on 180 $\mu$m sieve opening | 9.5 | 1.8 | 1.6 | 9.4 |
| passed 180 $\mu$m sieve opening | 1.6 | 0.0 | 1.2 | 2.0 |
| Particle size distribution B (% by weight) | 48.8 | 52.9 | 54.2 | 46.3 |
| Properties of molded article | | | | |
| Elongation at break (%) | 119 | 140 | 123 | 153 |
| Surface roughness ($\mu$m) | 2.5 | 2.6 | 2.6 | 2.7 |

EXAMPLES 8 to 11

A granulation was carried out in the same manner as in Example 1 except that the water-repelling-treated heat resistant aromatic polyoxybenzoyl ester resin powder (B) which was prepared in Preparation Example shown in Table 3 was used to obtain the resin powder for molding of the present invention. A state of separation of the filler, characteristics of the powder and properties of the molded article were evaluated. The results are shown in Table 3.

TABLE 3

|  | Ex. 8 | Ex. 9 | Ex. 10 | Ex. 11 |
|---|---|---|---|---|
| Water repelling treatment (Simple dry mixing method) | Prep. Ex. 8 | Prep. Ex. 9 | Prep. Ex. 10 | Prep. Ex. 11 |
| Heat resistant aromatic polyoxybenzoyl ester resin powder | Not treated | Not treated | Treated with silane coupling agent | Treated with silane coupling agent |
| Adhesion amount of PTFE fine powder (% by weight) | 10 | 40 | 10 | 40 |
| Components of resin powder (part by weight) | | | | |
| Resin powder subjected to water repelling treatment | 15 | 15 | 15 | 15 |
| PTFE powder | 80 | 80 | 80 | 80 |
| Natural graphite filler | 5 | 5 | 5 | 5 |
| Granulation method | Granulation in the state of emulsion | Granulation in the state of emulsion | Granulation in the state of emulsion | Granulation in the state of emulsion |
| Separation of filler | None | None | None | None |
| Characteristics of powder | | | | |
| Apparent density (g/cm$^3$) | 0.76 | 0.74 | 0.77 | 0.78 |
| Flowability (times) | 8 | 6.5 | 8 | 7 |

TABLE 3-continued

|  | Ex. 8 | Ex. 9 | Ex. 10 | Ex. 11 |
|---|---|---|---|---|
| Angle of repose (degree) | 36.5 | 37.5 | 38.8 | 38.7 |
| Electrostatic charge (V) | 8 | 8 | 5 | 8 |
| Average particle size ($\mu$m) | 463 | 376 | 451 | 425 |
| Particle size distribution A (% by weight) | | | | |
| on 1.7 mm sieve opening | 0.0 | 0.0 | 0.0 | 0.0 |
| on 850 $\mu$m sieve opening | 1.0 | 9.9 | 2.2 | 0.5 |
| on 500 $\mu$m sieve opening | 21.0 | 36.5 | 36.4 | 25.5 |
| on 300 $\mu$m sieve opening | 45.2 | 42.8 | 54.4 | 63.7 |
| on 250 $\mu$m sieve opening | 15.9 | 5.9 | 6.5 | 6.7 |
| on 180 $\mu$m sieve opening | 12.8 | 2.4 | 1.4 | 2.0 |
| passed 180 $\mu$m sieve opening | 2.9 | 0.4 | 0.4 | 0.4 |
| Particle size distribution B (% by weight) | 54.4 | 54.4 | 58.3 | 67.9 |
| Properties of molded article | | | | |
| Elongation at break (%) | 113 | 129 | 118 | 140 |
| Surface roughness ($\mu$m) | 2.5 | 2.6 | 2.8 | 2.6 |

EXAMPLES 12 to 15

A granulation was carried out in the same manner as in Example 1 except that the water-repelling-treated heat resistant aromatic polyoxybenzoyl ester resin powder (B) which was prepared in Preparation Example shown in Table 4 was used to obtain the resin powder for molding of the present invention. A state of separation of the filler, characteristics of the powder and properties of the molded article were evaluated. The results are shown in Table 4.

TABLE 4

|  | Ex. 12 | Ex. 13 | Ex. 14 | Ex. 15 |
|---|---|---|---|---|
| Water repelling treatment (Mechanochemical treatment method) | Prep. Ex. 12 | Prep. Ex. 13 | Prep. Ex. 14 | Prep. Ex. 15 |
| Heat resistant aromatic polyoxybenzoyl ester resin powder | Not treated | Not treated | Treated with silane coupling agent | Treated with silane coupling agent |
| Adhesion amount of PTFE fine powder (% by weight) | 10 | 20 | 10 | 20 |
| Components of resin powder (part by weight) | | | | |
| Resin powder subjected to water repelling treatment | 15 | 15 | 15 | 15 |
| PTFE powder | 80 | 80 | 80 | 80 |
| Natural graphite filler | 5 | 5 | 5 | 5 |
| Granulation method | Granulation in the state of emulsion | Granulation in the state of emulsion | Granulation in the state of emulsion | Granulation in the state of emulsion |
| Separation of filler | None | None | None | None |
| Characteristics of powder | | | | |
| Apparent density (g/cm$^3$) | 0.71 | 0.74 | 0.79 | 0.78 |
| Flowability (times) | 8 | 8 | 8 | 7 |
| Angle of repose (degree) | 36.4 | 37.0 | 37.7 | 38.3 |
| Electrostatic charge (V) | 7 | 6 | 8 | 8 |
| Average particle size ($\mu$m) | 483 | 444 | 497 | 421 |
| Particle size distribution A (% by weight) | | | | |
| on 1.7 mm sieve opening | 0.0 | 0.0 | 0.0 | 0.0 |
| on 850 $\mu$m sieve opening | 4.1 | 8.0 | 1.2 | 0.6 |
| on 500 $\mu$m sieve opening | 32.9 | 39.0 | 48.0 | 22.8 |
| on 300 $\mu$m sieve opening | 46.3 | 39.6 | 48.7 | 67.3 |
| on 250 $\mu$m sieve opening | 10.0 | 7.5 | 2.5 | 6.3 |
| on 180 $\mu$m sieve opening | 4.9 | 3.9 | 0.4 | 1.4 |
| passed 180 $\mu$m sieve opening | 0.6 | 0.8 | 0.0 | 0.4 |
| Particle size distribution B (% by weight) | 48.4 | 51.2 | 56.1 | 71.1 |
| Properties of molded article | | | | |
| Elongation at break (%) | 120 | 138 | 127 | 156 |
| Surface roughness ($\mu$m) | 2.5 | 2.7 | 2.6 | 2.7 |

EXAMPLES 16 to 17

A granulation was carried out in the same manner as in Example 1 except that the PTFE powders for molding which were prepared in Preparation Examples 16 and 17, respectively were used as a powder mixture for granulation to obtain the resin powder for molding of the present invention. A state of separation of the filler, characteristics of the powder and properties of the molded article were evaluated. The results are shown in Table 5.

TABLE 5

|  | Ex. 16 | Ex. 17 |
| --- | --- | --- |
| Water repelling treatment (Batch dry mixing method) | Prep. Ex. 16 | Prep. Ex. 17 |
| Heat resistant aromatic polyoxybenzoyl ester resin powder | Not treated | Treated with silane coupling agent |
| Adhesion amount of PTFE fine powder (% by weight) | 40 | 40 |
| Components of resin powder (part by weight) | | |
| Resin powder subjected to water repelling treatment | 15 | 15 |
| PTFE powder | 80 | 80 |
| Natural graphite filler | 5 | 5 |
| Granulation method | Granulation in the state of emulsion | Granulation in the state of emulsion |
| Separation of filler | None | None |
| Characteristics of powder | | |
| Apparent density (g/cm$^3$) | 0.71 | 0.74 |
| Flowability (times) | 7 | 8 |
| Angle of repose (degree) | 39.9 | 38.8 |
| Electrostatic charge (V) | 9 | 7 |
| Average particle size ($\mu$m) | 531 | 463 |
| Particle size distribution A (% by weight) | | |
| on 1.7 mm sieve opening | 0.0 | 0.0 |
| on 850 $\mu$m sieve opening | 10.8 | 5.5 |
| on 500 $\mu$m sieve opening | 43.1 | 35.2 |
| on 300 $\mu$m sieve opening | 38.8 | 49.8 |
| on 250 $\mu$m sieve opening | 4.9 | 6.5 |
| on 180 $\mu$m sieve opening | 1.2 | 1.8 |
| passed 180 $\mu$m sieve opening | 0.0 | 0.0 |
| Particle size distribution B (% by weight) | 49.0 | 54.4 |
| Properties of molded article | | |
| Elongation at break (%) | 107 | 120 |
| Surface roughness ($\mu$m) | 2.8 | 2.6 |

EXAMPLE 18

A granulation was carried out in the same manner as in Example 1 except that the surfactant (Pronon #102) was not added in the granulation to obtain the resin powder for molding of the present invention. A state of separation of the filler in the granulation, characteristics of the obtained resin powder and properties of the molded article were evaluated in the same manner as in Example 1. The results are shown in Table 6.

EXAMPLE 19

A granulation was carried out in the same manner as in Example 5 (the heat resistant aromatic polyoxybenzoyl ester resin powder (B) subjected to water repelling treatment by the co-coagulation method was used) except that the natural graphite was not blended and the amount of the PTFE powder was 85% by weight to obtain the resin powder for molding of the present invention. A state of separation of the filler in the granulation, characteristics of the obtained resin powder and properties of the molded article were evaluated in the same manner as in Example 1. The results are shown in Table 6.

COMPARATIVE EXAMPLE 1

A granulation was carried out in the same manner as in Example 18 (method of granulation in water) except that the heat resistant aromatic polyoxybenzoyl ester resin powder (B) not subjected to water repelling treatment was used to obtain the resin powder for molding for comparison. A state of separation of the filler in the granulation, characteristics of the obtained resin powder and properties of the molded article were evaluated in the same manner as in Example 1. The results are shown in Table 6.

COMPARATIVE EXAMPLE 2

A granulation was carried out in the same manner as in Example 1 (method of granulation in the state of emulsion) except that the heat resistant aromatic polyoxybenzoyl ester resin powder (B) not subjected to water repelling treatment was used to obtain the resin powder for molding for comparison. A state of separation of the filler in the granulation, characteristics of the obtained resin powder and properties of the molded article were evaluated in the same manner as in Example 1. The results are shown in Table 6.

TABLE 6

|  | Ex. 18 | Ex. 19 | Com. Ex. 1 | Com. Ex. 2 |
| --- | --- | --- | --- | --- |
| Water repelling treatment Heat resistant aromatic polyoxybenzoyl ester resin powder | Prep. Ex. 1 Not treated | Prep. Ex. 5 Not treated | — Not treated | — Not treated |
| Components of resin powder (part by weight) | | | | |
| Resin powder subjected to water repelling treatment | 15 | 15 | — | — |
| Resin powder not treated | — | — | 15 | 15 |
| PTFE powder | 80 | 85 | 80 | 80 |
| Natural graphite filler | 5 | — | 5 | 5 |
| Granulation method | Granulation in water | Granulation in the state of emulsion | Granulation in water | Granulation in the state of emulsion |
| Separation of filler | None | None | Found | Found |

TABLE 6-continued

|  | Ex. 18 | Ex. 19 | Com. Ex. 1 | Com. Ex. 2 |
|---|---|---|---|---|
| Characteristics of powder |  |  |  |  |
| Apparent density (g/cm$^3$) | 0.70 | 0.75 | 0.68 | 0.71 |
| Flowability (times) | 5 | 8 | 5 | 7 |
| Angle of repose (degree) | 42.5 | 39.1 | 43.1 | 40.9 |
| Electrostatic charge (V) | 121 | 10 | 183 | 8 |
| Average particle size (μm) | 618 | 434 | 888 | 495 |
| Particle size distribution A (% by weight) |  |  |  |  |
| on 1.7 mm sieve opening | 0.0 | 0.0 | 0.2 | 0.0 |
| on 850 μm sieve opening | 11.4 | 3.3 | 16.8 | 11.4 |
| on 500 μm sieve opening | 59.2 | 33.4 | 55.2 | 59.2 |
| on 300 μm sieve opening | 26.4 | 40.4 | 15.1 | 26.4 |
| on 250 μm sieve opening | 1.4 | 12.1 | 0.6 | 1.4 |
| on 180 μm sieve opening | 0.2 | 8.2 | 0.4 | 0.2 |
| passed 180 μm sieve opening | 0.2 | 1.4 | 0.4 | 0.2 |
| Particle size distribution B (% by weight) | 61.8 | 46.0 | 88.2 | 48.8 |
| Properties of molded article |  |  |  |  |
| Elongation at break (%) | 66 | 269 | 18 | 15 |
| Surface roughness (μm) | 3.7 | 2.5 | 4.9 | 2.9 |

According to the present invention, a resin powder for molding free from separation of a filler and having excellent flowability and apparent density which are important characteristics in handling a powder can be obtained, and a PTFE molded article having a high elongation which has not been obtained so far can be provided.

What is claimed is:

1. A resin powder for molding which comprises 35 to 97% by weight of a polytetrafluoroethylene powder having an average particle size of not more than 120 μm, 35 to 2% by weight of a heat resistant aromatic polyoxybenzoyl ester resin powder subjected to water repelling treatment and 30 to 1% by weight of a graphite, said resin powder for molding has an apparent density of not less than 0.6 g/cm$^3$ and an average particle size of not more than 800 μm, provides a molded article having an elongation at break of not less than 20% and is prepared by granulating a mixture of the polytetrafluoroethylene powder, the heat resistant aromatic polyoxybenzoyl ester resin powder and the graphite by stirring in water in the presence of an organic liquid forming a liquid—liquid interface with water.

2. The resin powder for molding of claim 1, wherein the heat resistant aromatic polyoxybenzoyl ester resin powder subjected to water repelling treatment is obtained by co-coagulation of a non-treated heat resistant aromatic polyoxybenzoyl ester resin powder and a dispersion of polytetrafluoroethylene particles.

3. The resin powder for molding of claim 1, wherein the heat resistant aromatic polyoxybenzoyl ester resin powder subjected to water repelling treatment is obtained by co-coagulation of a heat resistant aromatic polyoxybenzoyl ester resin powder surface-treated previously with a silane coupling agent and a dispersion of polytetrafluoroethylene particles.

4. The resin powder for molding of claim 1, wherein the heat resistant aromatic polyoxybenzoyl ester resin powder subjected to water repelling treatment is obtained by dry mixing of a non-treated heat resistant aromatic polyoxybenzoyl ester resin powder and a polytetrafluoroethylene fine powder prepared by emulsion polymerization while applying shearing force to the mixture.

5. The resin powder for molding of claim 1, wherein the heat resistant aromatic polyoxybenzoyl ester resin powder subjected to water repelling treatment is obtained by dry mixing of a heat resistant aromatic polyoxybenzoyl ester resin powder surface-treated previously with a silane coupling agent and a polytetrafluoroethylene fine powder prepared by emulsion polymerization while applying shearing force to the mixture.

6. The resin powder for molding of claim 1, wherein the heat resistant aromatic polyoxybenzoyl ester resin powder subjected to water repelling treatment is obtained by dry mixing of a non-treated heat resistant aromatic polyoxybenzoyl ester resin powder and a polytetrafluoroethylene fine powder prepared by emulsion polymerization while finely pulverizing the mixture and applying shearing force to the mixture.

7. The resin powder for molding of claim 1, wherein the heat resistant aromatic polyoxybenzoyl ester resin powder subjected to water repelling treatment is obtained by dry mixing of a heat resistant aromatic polyoxybenzoyl ester resin powder surface-treated previously with a silane coupling agent and a polytetrafluoroethylene fine powder prepared by emulsion polymerization while finely pulverizing the mixture and applying shearing force to the mixture.

8. The resin powder for molding of claim 1, wherein the polytetrafluoroethylene powder having an average particle size of not more than 120 μm is a modified polytetrafluoroethylene powder which is not melt-moldable and contains from 0.001 to 1% by weight of a perfluoro vinyl ether unit represented by the formula (1):

$$-CF_2-CF(-O-X)- \tag{1}$$

wherein X is a perfluoroalkyl group having 1 to 6 carbon atoms or a perfluoroalkoxyalkyl group having 4 to 9 carbon atoms.

9. The resin powder for molding of claim 8, wherein a molded article obtained by molding the modified polytetrafluoroethylene powder solely has a life of bending 7,000,000 times or more.

10. The resin powder for molding of claim 1, wherein an elongation of a molded article obtained from the resin powder for molding is not less than 50%.

11. The resin powder for molding of claim 1, wherein an elongation of a molded article obtained from the resin powder for molding is not less than 100%.

12. A process for preparing the resin powder for molding of claim 1, which comprises adding 35 to 2% by weight of the heat resistant aromatic polyoxybenzoyl ester resin powder subjected to water repelling treatment and 30 to 1% by weight of the graphite to 35 to 97% by weight of the polytetrafluoroethylene powder having an average particle size of not more than 120 μm to obtain a mixture and granulating the mixture by stirring in water in the presence of an organic liquid forming a liquid—liquid interface with water and a surfactant.

13. A process for preparing the resin powder for molding of claim 1, which comprises adding a polytetrafluoroethylene fine powder prepared by emulsion polymerization to 35 to 97% by weight of the polytetrafluoroethylene powder having an average particle size of not more than 120 μm, 35 to 2% by weight of the non-treated heat resistant aromatic polyoxybenzoyl ester resin powder and 30 to 1% by weight of the graphite, dry-mixing to obtain a mixture while applying shearing force to the mixture and granulating the mixture by stirring in water in the presence of an organic liquid forming a liquid—liquid interface with water and a surfactant.

14. A process for preparing the resin powder for molding of claim 1, which comprises adding a polytetrafluoroethylene fine powder prepared by emulsion polymerization to 35 to 97% by weight of the polytetrafluoroethylene powder having an average particle size of not more than 120 μm, 35 to 2% by weight of the heat resistant aromatic polyoxybenzoyl ester resin powder surface-treated previously with a silane coupling agent and 30 to 1% by weight of the graphite, dry-mixing to obtain a mixture while applying shearing force to the mixture and granulating the mixture by stirring in water in the presence of an organic liquid forming a liquid—liquid interface with water and a surfactant.

15. A process for preparing the resin powder for molding of claim 1, which comprises adding 35 to 2% by weight of the heat resistant aromatic polyoxybenzoyl ester resin powder subjected to water repelling treatment and 30 to 1% by weight of the graphite to 35 to 97% by weight of the polytetrafluoroethylene powder having an average particle size of not more than 120 μm to obtain a mixture and granulating the mixture by stirring in water in the presence of an organic liquid forming a liquid—liquid interface with water.

16. The resin powder for molding of claim 1, which has an apparent density of not less than 0.60 g/cm$^3$ and less than 0.7 g/cm$^3$, an angle of repose of not more than 42 degrees, an average particle size of not more than 500 μm, a flowability of not less than 5 times and an electrostatic charge of not more than 50 V.

17. The resin powder for molding of claim 1, which has an apparent density of not less than 0.70 g/cm$^3$ and less than 0.75 g/cm$^3$, an angle of repose of not more than 40 degrees, an average particle size of not more than 500 μm, a flowability of not less than 5 times and an electrostatic charge of not more than 50 V.

18. The resin powder for molding of claim 1, which has an apparent density of not less than 0.75 g/cm$^3$ and not more than 0.85 g/cm$^3$, an angle of repose of not more than 38 degrees, an average particle size of not more than 500 μm, a flowability of not less than 5 times and an electrostatic charge of not more than 50 V.

* * * * *